United States Patent
Overland et al.

(10) Patent No.: US 8,493,037 B2
(45) Date of Patent: *Jul. 23, 2013

(54) ENERGY CAPTURE CIRCUIT

(75) Inventors: John E. Overland, Plymouth, MN (US); James L. Yost, Plymouth, MN (US)

(73) Assignee: Alliant Techsystems Inc., Minneapolis, MN (US)

( * ) Notice: Subject to any disclaimer, the term of this patent is extended or adjusted under 35 U.S.C. 154(b) by 41 days.

This patent is subject to a terminal disclaimer.

(21) Appl. No.: 13/020,510

(22) Filed: Feb. 3, 2011

(65) Prior Publication Data

US 2011/0121792 A1    May 26, 2011

Related U.S. Application Data

(63) Continuation of application No. 11/925,188, filed on Oct. 26, 2007, now Pat. No. 7,884,579.

(51) Int. Cl.
*H02J 7/00*    (2006.01)

(52) U.S. Cl.
USPC ............................ 320/166; 320/140; 320/167

(58) Field of Classification Search
USPC ........................................................ 320/166
See application file for complete search history.

(56) References Cited

U.S. PATENT DOCUMENTS

| | | | | |
|---|---|---|---|---|
| 3,517,132 A * | 6/1970 | Rimlinger | ..................... | 370/308 |
| 3,914,763 A * | 10/1975 | Green et al. | ................... | 342/161 |
| 5,717,318 A * | 2/1998 | Matsuda et al. | .............. | 323/273 |
| 7,191,707 B1 * | 3/2007 | Davis | ............................ | 102/488 |
| 7,884,579 B2 * | 2/2011 | Overland et al. | ............. | 320/166 |
| 2007/0024254 A1 | 2/2007 | Radecker et al. | | |

* cited by examiner

*Primary Examiner* — Edward Tso
*Assistant Examiner* — Johali Torres Ruiz
(74) *Attorney, Agent, or Firm* — Vidas, Arrett & Steinkraus, P.A.

(57) ABSTRACT

An energy capture circuit for capturing energy in response to an input pulse. The circuit is constructed and arranged to transfer input energy in time divided portions among subcircuits. This includes a storage means, a clock means, at least two subcircuits, and at least one transfer circuit. Each subcircuit includes a first inductive means in operative communication with the input source, a rectifying means for producing a positive current in operative communication with the first inductive means, a capacitive means in operative communication with the rectifying means, and a switch means in operative communication with the capacitive means. At least one transfer circuit is in operative communication with each of the switch means of the at least two subcircuits. The output of the clock means is in operative communication with both a first switch means and an inverter means, the inverter means having an output in operative communication with a second switch means.

13 Claims, 12 Drawing Sheets

ENERGY CAPTURE CIRCUIT

CROSS-REFERENCE TO RELATED APPLICATIONS

This application is a continuation of U.S. application Ser. No. 11/925,188, filed Oct. 26, 2007, the entire contents of which are incorporated herein by reference.

STATEMENT REGARDING FEDERALLY SPONSORED RESEARCH

Not Applicable.

FIELD OF THE INVENTION

The present invention relates to pulse powered fuzes. In particular the invention relates to a fuze circuit designed to improve the efficiency of pulse energy capture.

BACKGROUND OF THE INVENTION

Mission lifetimes for pulse powered devices, such as gravity bomb fuzes, are limited by the voltage, current, and duration of the host platform power pulse. Existing pulse energy capture circuits transfer pulse energy into storage capacitors. However, the theoretical limit of energy captured by the existing capacitor-only pulse energy capture circuits is only 50% of the energy available to be captured, as shown below:

$E_{captured} = \frac{1}{2}CV^2$, the energy captured by a capacitor, where C is the value of the capacitor's capacitance, and V is the voltage across the capacitor.

$E_{available} = V*I*t$, the energy available to be stored, where I is the value of the current flowing, and t is the time duration of the current pulse.

$I = C(dV/dt)$, the current through the capacitor, where $dV/dt$ is the rate of change of voltage across the capacitor, so solving for C and looking at a fixed increment of time, $C = (I/V)*t$, therefore substituting this result into the $E_{captured}$ equation above results in $$E_{captured} = \frac{1}{2}V*I*t,$$

therefore $$E_{captured} = \frac{1}{2}E_{available}$$

Of course, while it is theoretically possible to capture 50% of the energy available, in reality only about 39% of the energy is actually captured, due to normal losses in the circuit.

Electronic Safe-and-Arm Devices (ESAD), the most reliable type of bomb fuze, require at least twice the energy of conventional out-of-line fuze components. Therefore, a need exists for a circuit technique that increases the amount of energy captured above the 50% efficiency barrier in pulse power bomb fuzes.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. §1.56(a) exists.

All U.S. patents and applications and all other published documents mentioned anywhere in this application are incorporated herein by reference in their entirety.

Without limiting the scope of the invention, a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided for the purposes of complying with 37 C.F.R. §1.72.

BRIEF SUMMARY OF THE INVENTION

In at least one embodiment, the present invention is directed towards a high efficiency energy capture circuit for capturing energy in response to an input pulse from an input source. The circuit comprises a storage means having a first and a second terminal, a clock means having an output, and at least two subcircuits.

Each subcircuit comprises a first inductive means, the first inductive means comprising a first and a second terminal, the first terminal in operative communication with the input source. Each subcircuit further comprises a rectifying means for producing a positive current, the rectifying means comprising a first terminal and a second terminal, the first terminal in operative communication with the second terminal of the first inductive means. Also, each subcircuit comprises a capacitive means comprising a first terminal and a second terminal, the first terminal of the capacitive means in operative communication with the second terminal of the rectifying means, and the second terminal of the capacitive means in operative communication with a circuit ground. And, each subcircuit further comprises a switch means comprising a first terminal and a second terminal, the first terminal in operative communication with the first terminal of the capacitive means.

The output of the clock means is in operative communication with a first switch means, as well as an inverter means, the inverter means having an output in operative communication with a second switch means.

The high efficiency energy capture circuit also comprises at least one transfer circuit being in operative communication with each of the switch means of the at least two subcircuits, as well as the storage means.

In some embodiments, the present invention is directed towards a high efficiency energy capture circuit for capturing energy in response to an input pulse from an input source. The circuit comprises a storage capacitor having a first and a second terminal, a clock having an output, and at least two subcircuits.

Each subcircuit comprises a first inductor, the first inductor comprising a first and a second terminal, the first terminal in operative communication with an input source. Each subcircuit further comprises a rectifying diode for producing a positive current, the rectifying diode comprising a first terminal and a second terminal, the first terminal in operative communication with the second terminal of the first inductor. Also, each subcircuit comprises a capacitor having a first terminal and a second terminal, the first terminal of the capacitor in operative communication with the second terminal of the rectifying diode. And, each subcircuit further comprises a transistor comprising a first terminal, a second terminal, and a third terminal, the first terminal in operative communication with the first terminal of the capacitor.

The output of the clock is in operative communication with a first transistor, as well as an inverter means, the inverter means having an output in operative communication with a second transistor.

The high efficiency energy capture circuit also comprises at least one transfer circuit being in operative communication with each of the transistors of the at least two subcircuits, as well as the storage capacitor.

Another embodiment of the present invention is directed towards a method of capturing energy in response to an input pulse from an input source. The method comprises providing a storage capacitor having a first and a second terminal, providing a clock having an output, and providing at least two subcircuits.

Each subcircuit comprises a first inductor in operative communication with the input source. Each subcircuit also comprises a rectifying diode for producing a positive current, the rectifying diode comprising a first terminal and a second terminal, the first terminal in operative communication with the first inductor. Also, each subcircuit comprises a capacitor having a first terminal and a second terminal, the first terminal of the capacitor in operative communication with the second terminal of the rectifying means and the second terminal of the capacitor in operative communication with a circuit ground. And, each subcircuit comprises a transistor comprising a first terminal, a second terminal, and a third terminal, the first terminal in operative communication with the first terminal of the capacitor.

The method further comprises providing at least one transfer circuit in operative communication with each of the at least two subcircuits. The method further comprises applying a clock signal to the at least two subcircuits with a clock, the clock having an output in operative communication with a first transistor, the clock output further in operative communication with an inverter, the inverter having an output in operative communication with a second transistor. The method further comprises storing the energy in the storage capacitor, the storage capacitor having a first and second terminal, the first terminal being in operative communication with the at least one transfer circuit.

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

BRIEF DESCRIPTION OF THE DRAWINGS

A detailed description of the invention is hereafter described with specific reference being made to the drawings.

DETAILED DESCRIPTION OF THE INVENTION

Figure 1:
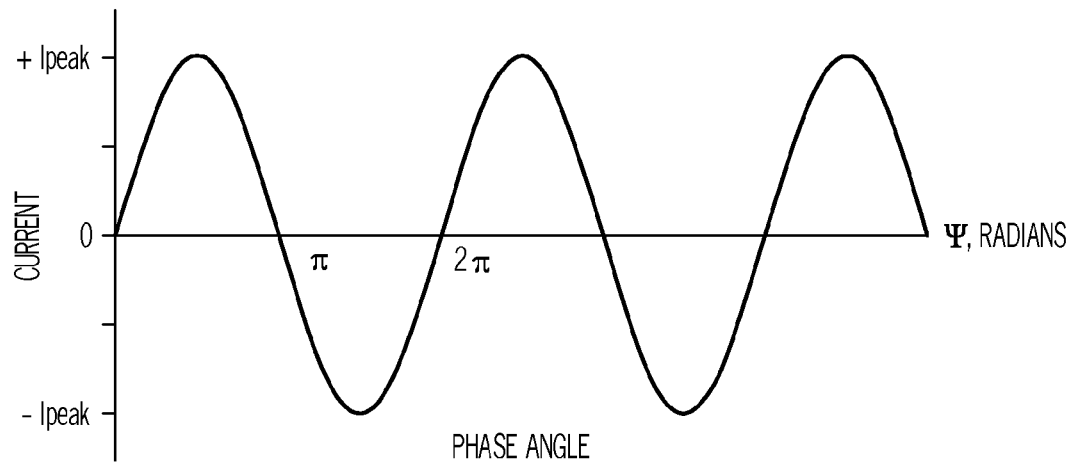
FIG. 1 is a waveform diagram of a sine wave.

While this invention may be embodied in many different forms, there are described in detail herein specific preferred embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

As stated above, the theoretical limit for existing pulse energy capture circuits that transfer pulse energy only into a storage capacitor is 50%. The present invention increases the theoretical limit from 50% to about 95% by using at least two circuits, each produces a positive ½ sine current waveform and including an inductor. Each of the two circuits must be properly phased. A ½ triangular waveform being produced by each subcircuit is another implementation for this circuit that achieves 100% theoretical efficiency.

Figure 2:
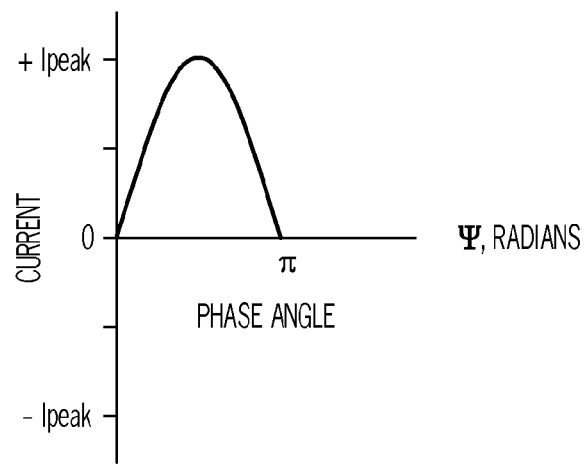
FIG. 2 is a portion of the waveform diagram of FIG. 1, showing the positive current is supplied over only one-half period.
Figure 3:
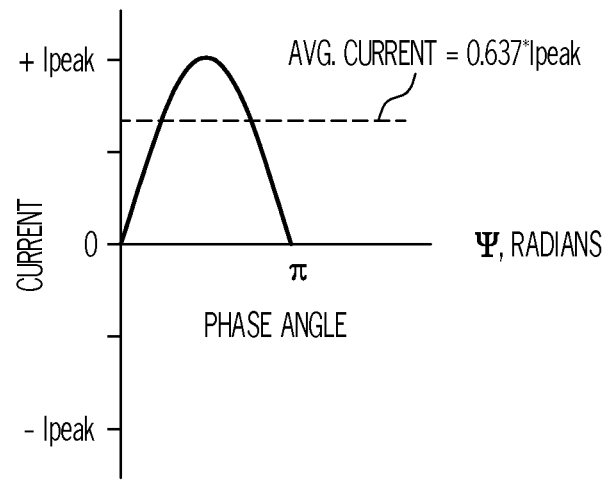
FIG. 3 is the waveform diagram of FIG. 2, showing the average current delivered over the half-period.

The area under the curve of a sine wave is a fundamental building block of the theoretical approach to the circuit design of the present invention. Referring to FIG. 1, current in the form of a sine wave with a period of $2\pi$ curve is shown. The sine wave is only positive over half of the sine wave's period. Because of the full wave rectified power supplied in the present application, the design of the present invention only utilizes positive current. Also, a rectifying diode (shown in FIG. 6) prevents current from flowing back toward the source and forces the current to flow in one direction only; thus only ½ of the sine wave is of interest for each bank. FIG. 2 depicts a portion of the sine wave shown in FIG. 1. The area under the curve shown in FIG. 2 represents the total amount of positive current supplied during one half-period of the sine wave and is calculated by integrating the sine wave from 0 to $\pi$. Assuming that the wave has a peak amplitude of $I_{peak}$, the total area under the curve from 0 to $\pi$ equals $2*I_{peak}$. The average current delivered over the half-period from 0 to $\pi$ equals $(2*I_{peak})/\pi$, or approximately $0.637*I_{peak}$, as shown in FIG. 3.

As will be discussed in more detail below, an embodiment of the input section of the present invention is comprised of at least two separate capture banks such that while current is flowing into one bank (bank "A"), the other bank (bank "B") is discharging its current into storage. The process then reverses and continues repeating until the input power source is removed.

In one application of an embodiment of the present invention, the circuit is used to provide power to the FMU 139 bomb fuze. The requirements for the FMU 139 bomb fuze are provided in the document entitled "Performance Specification For The Fuze, Bomb, Electronic FMU-139 D/B." The specification requires that when pulsed power is applied for a duration equal to or greater than 15 milliseconds, the input current must not exceed 220 milliamps. The input voltage is a minimum of 195 volts, but can be as high as 300 volts. To provide for the worst-case scenario, embodiments of the present invention were designed using the 195 volts as the available input voltage.

Thus, the two ½ sine waveforms must be properly phased such that the sum at any point in time does not exceed the 220 mA threshold. Proper phasing is accomplished by calculating the phase angle where the waveform is 50% of the maximum value:

$$\sin \theta = 0.5$$

$$\theta = \sin^{-1}(0.5)$$

$$\theta = 30 \text{ degrees}$$

Therefore, between 0 and $\pi$, a sine wave with period $2\pi$ reaches its 50% value twice, once on the rising edge at 30 degrees and again on the falling edge at 150 degrees.

Figure 4:
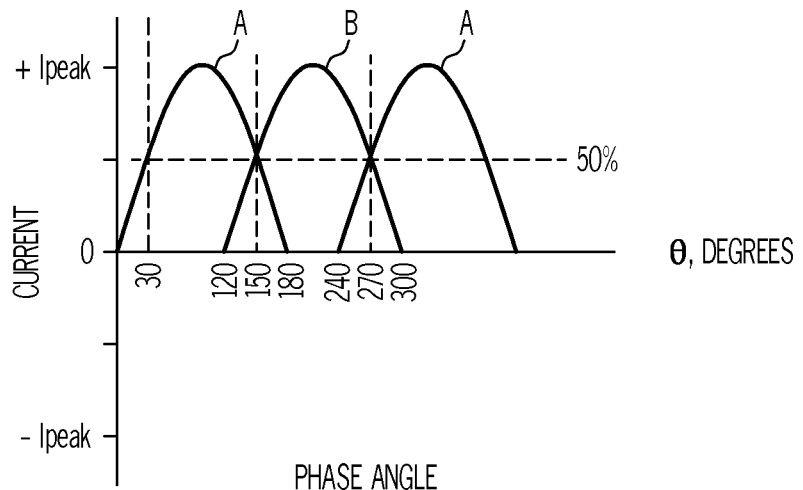
FIG. 4 depicts a portion of two ½ sine waveforms that are 120 degrees out of phase with each other.

It should be clear that if the first sine wave reaches a 50% point at a phase angle of 150 degrees, in order for the summation of current to be maximized, but yet stay below the 220 mA threshold, the second sine wave must reach its 50% point when the first sine wave reaches its 50% point. If the rising edge of a sine wave is at a maximum at a phase angle of 30 degrees, the second sine wave must begin at the 120 degree phase angle of the first sine wave. Similarly, at the falling edge of the second sine wave, the next cycle of the first sine wave does not begin again until the 240 degree phase angle of the second sine wave. This is the optimum phasing to achieve maximum current delivery below the threshold value of 220 mA. This is depicted graphically in FIG. 4. The frequency of the clock means is set to maintain proper phasing of the sine waves and thus produce the maximum efficiency during energy capture.

Of course not all of the current flowing into the energy capture circuit is captured; some of the current is "lost" through normal circuit inefficiencies, like resistance in the windings of the inductors, leakage in capacitors, as well as resistance in the traces on a circuit board.

Figure 5:
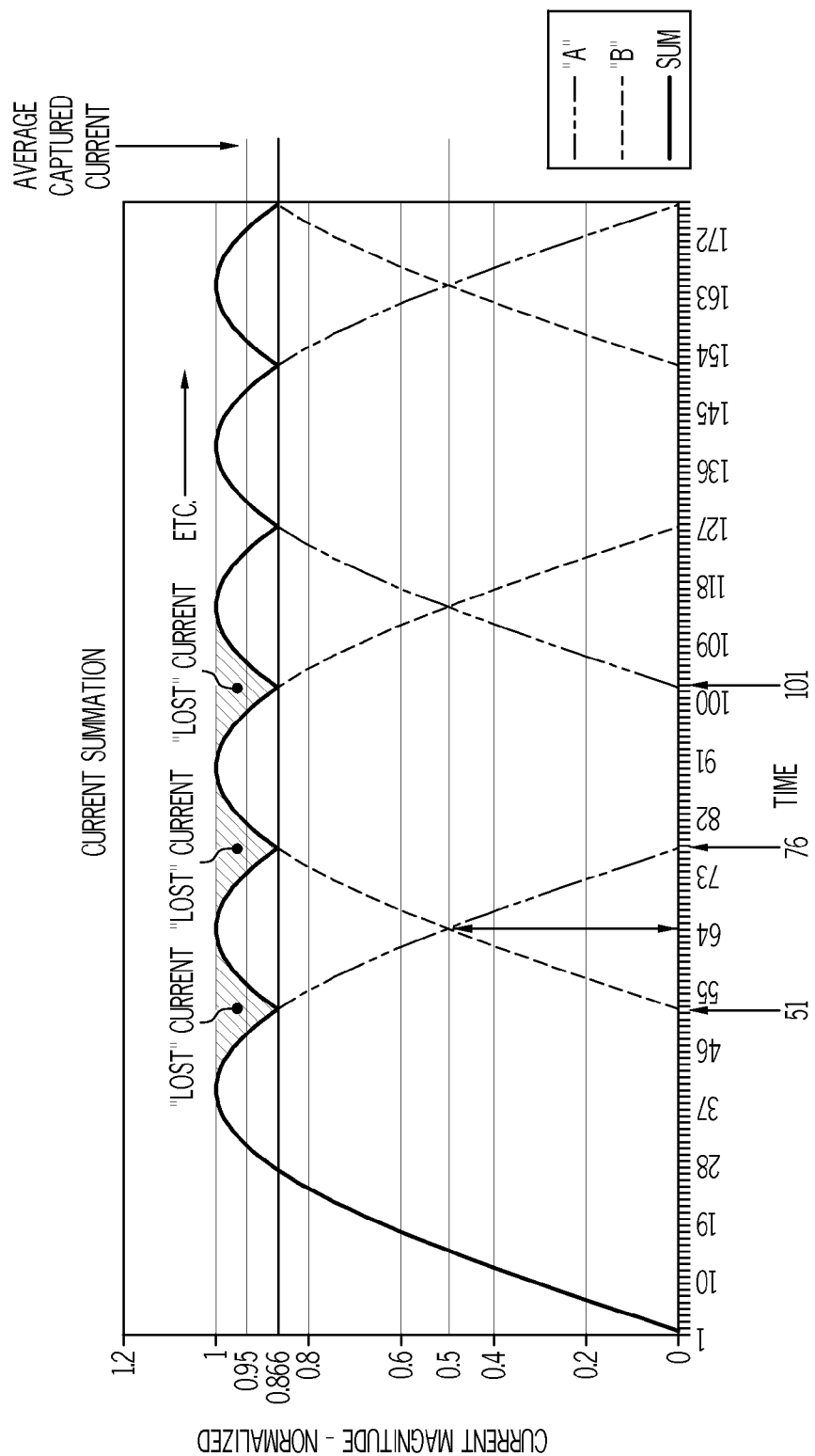
FIG. 5 depicts the two ½ sine waveforms of FIG. 4 after current summation.

A graphical analysis, shown in FIG. 5, shows that the valley in the ripple created by the sum of two sine waves dips down to approximately $0.866*I_{peak}$. The peak of the ripple is then 1.00 minus 0.866, or 0.134. The amount of current that cannot be captured by this technique is determined by subtracting the area of one cycle of the summed current from the total possible area formed by a rectangle around that same time frame, or by taking the average ripple current and subtracting this value from 0.134. The average value of the ripple current is approximately 0.085. Adding 0.085 to the bottom of the valley noted above results in a total current of 0.866+0.085=0.9515. The lost current is therefore 1−0.9515=0.0485, or 4.85% of the available current. In other words, the circuit has a theoretical efficiency of approximately 95%. Tests in the laboratory show that the actual circuit has an efficiency of 95% at the resonant capacitors and then even with additional circuit inefficiencies (resistance in the windings of the inductors, leakage in capacitors, resistance in the traces on the circuit boards) the invention still transfers and stores 78% of the total input energy. This circuit is thus much more efficient than the capacitor-only pulse energy capture circuits (39% efficiency).

Figure 6:
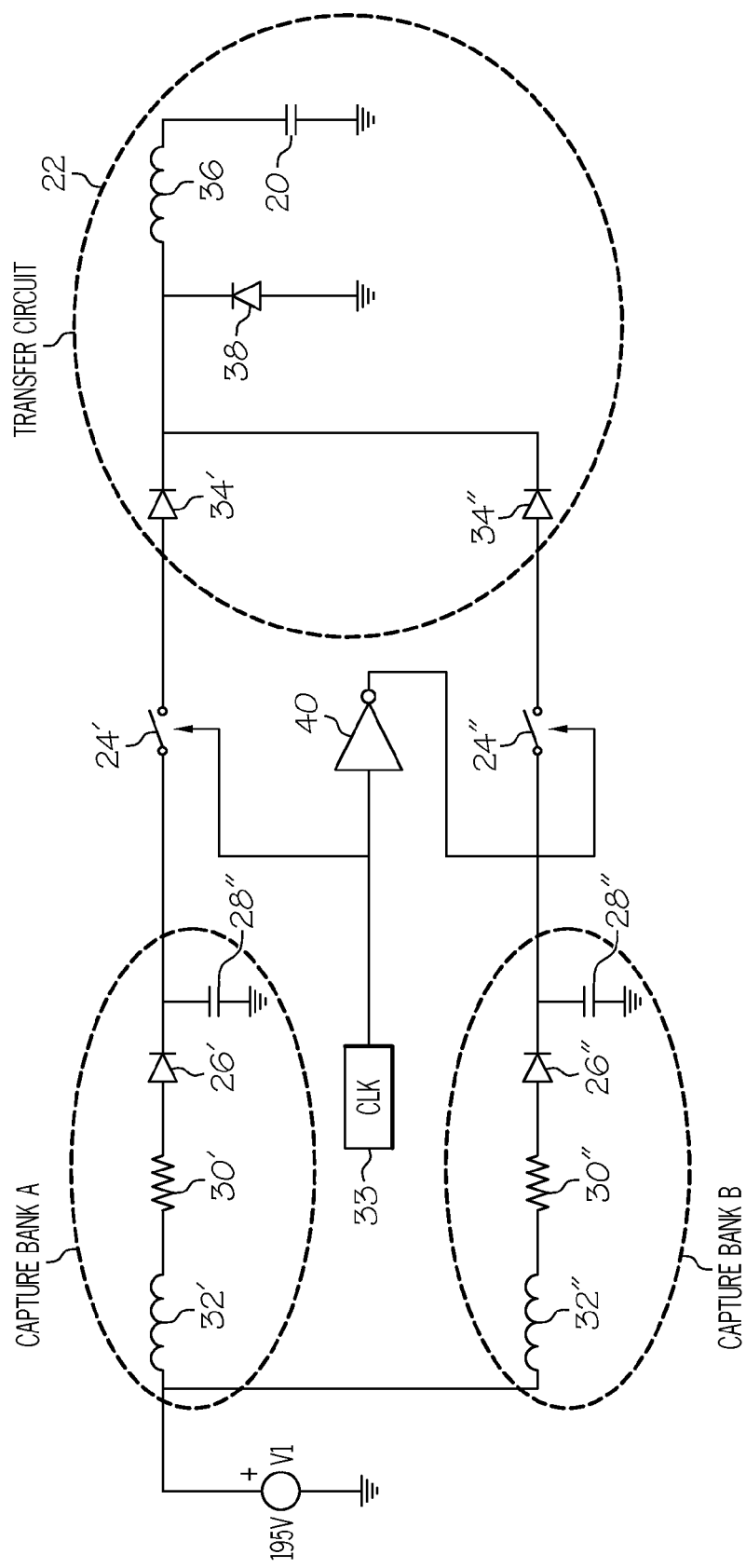
FIG. 6 depicts an embodiment of the energy capture circuit of the present invention.
Figure 7A:
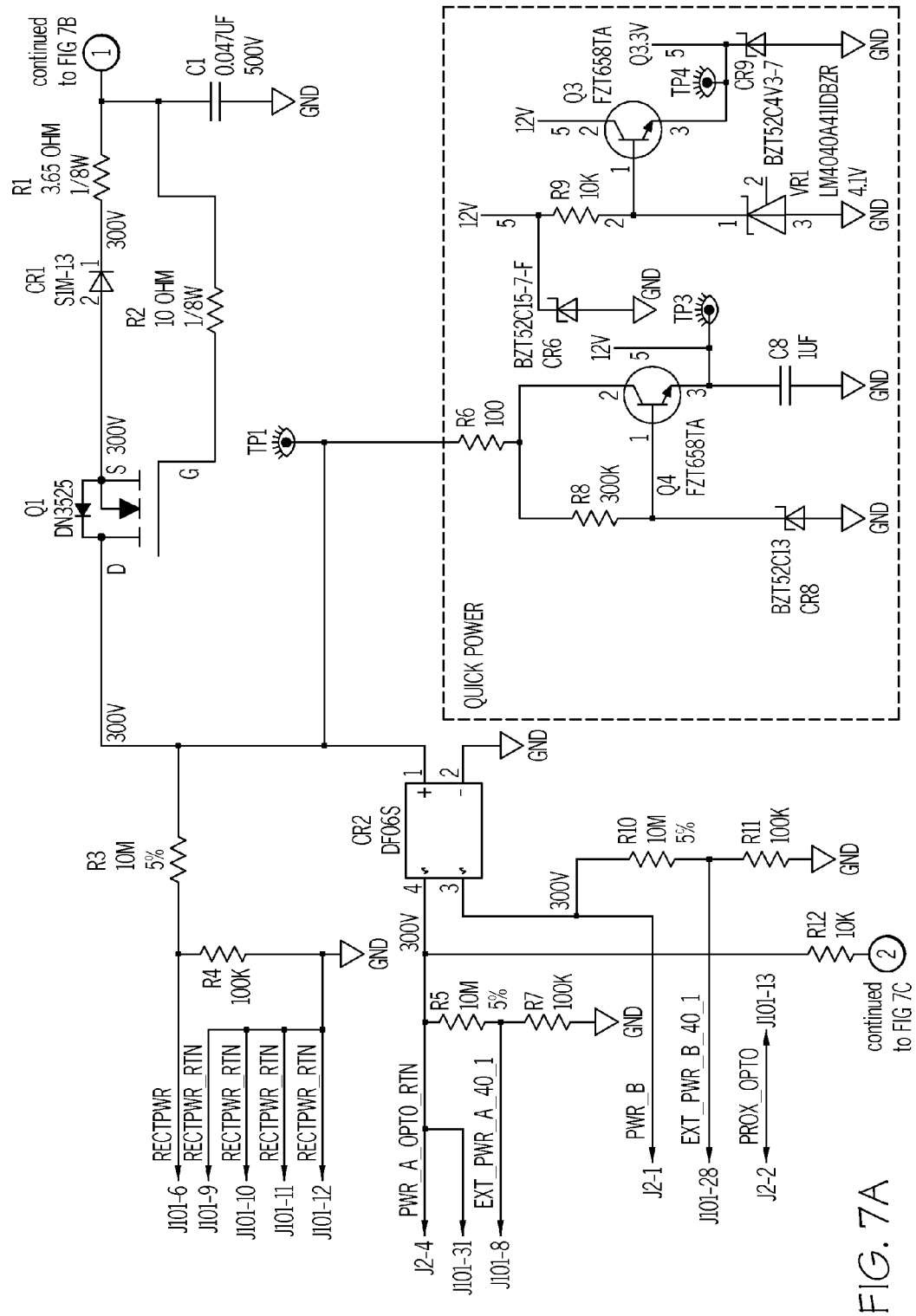
FIGS. 7A-7H depict a specific application of an embodiment of the energy capture circuit of the present invention.
Figure 7B:
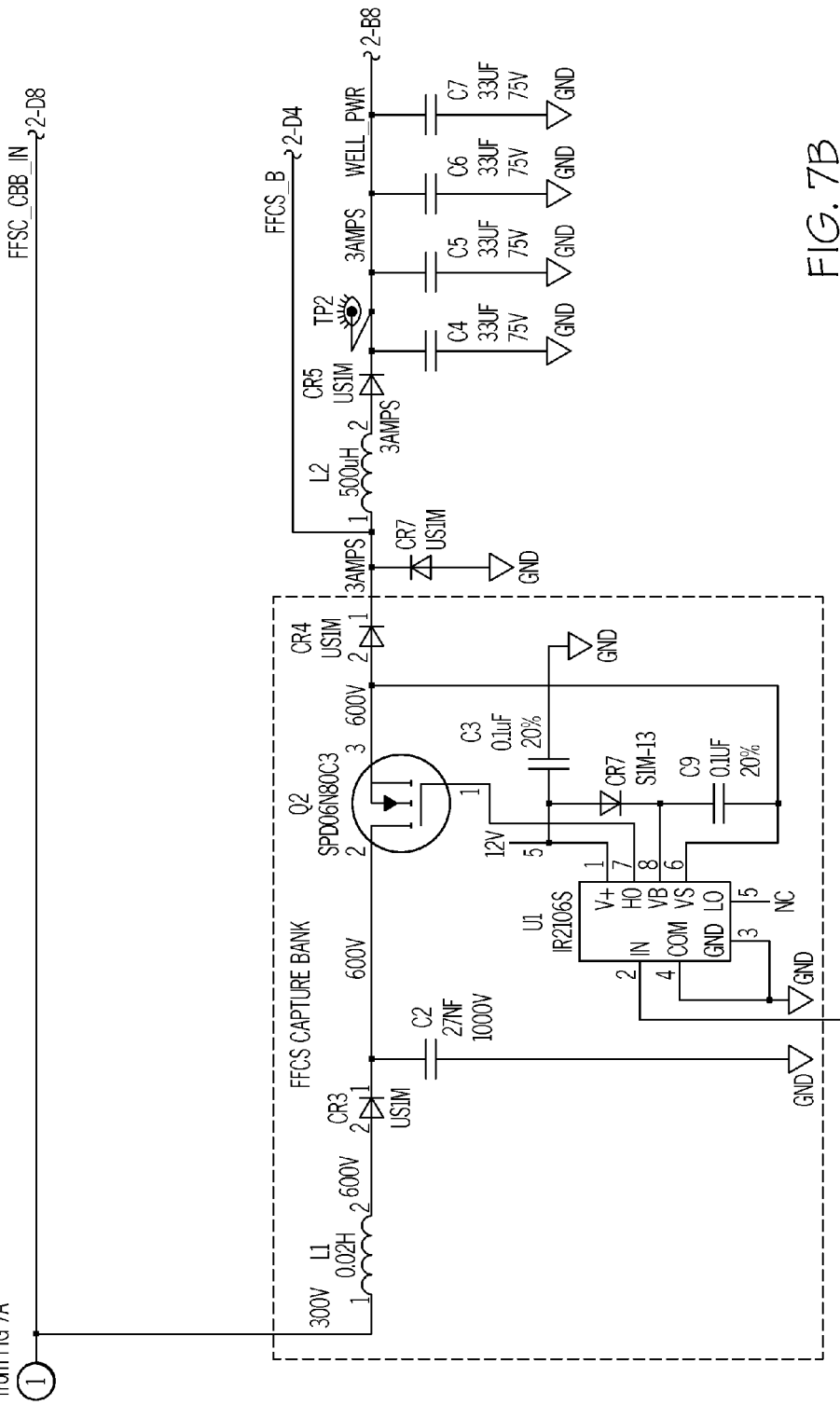
Figure 7C:
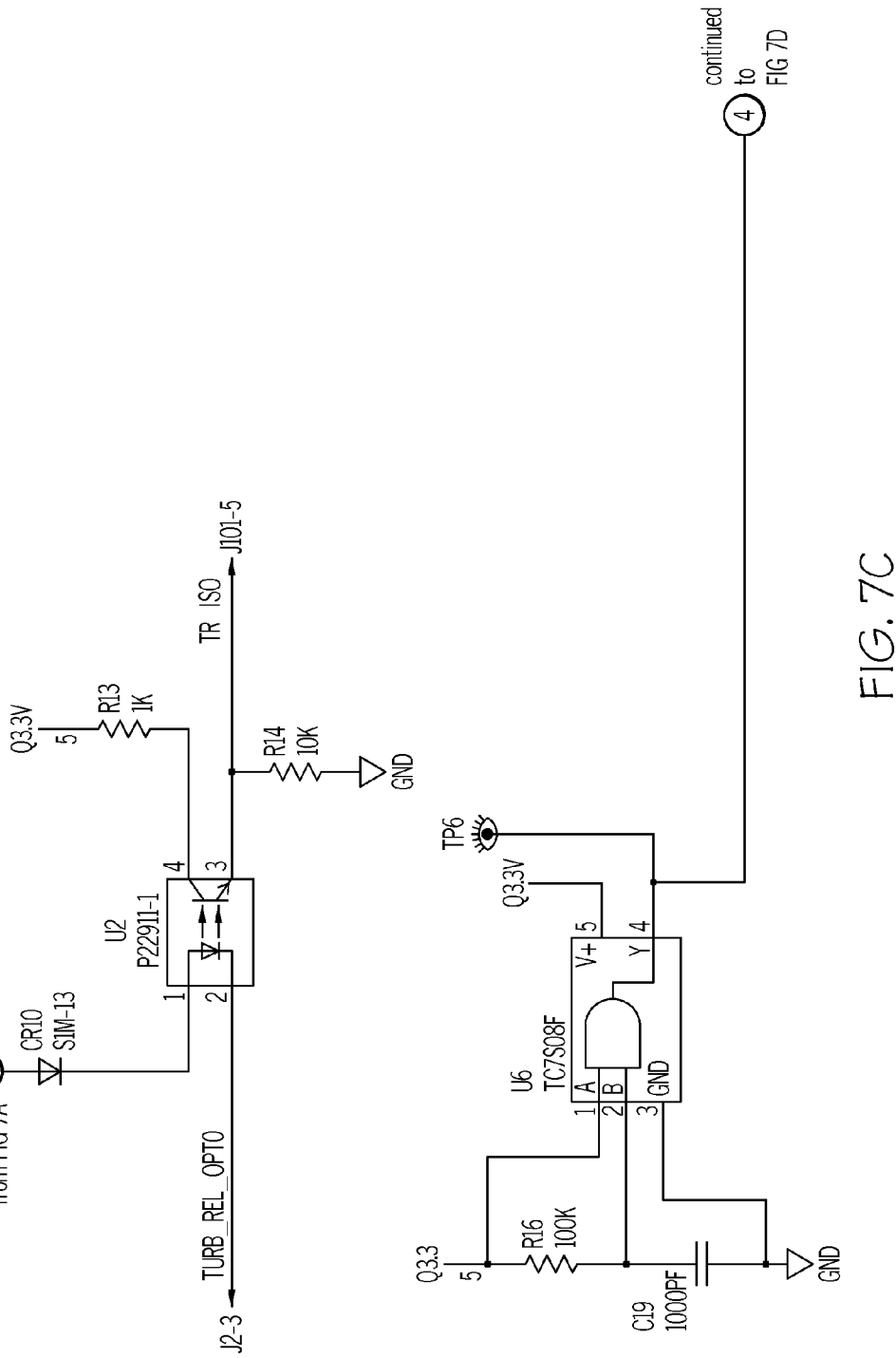
Figure 7D:
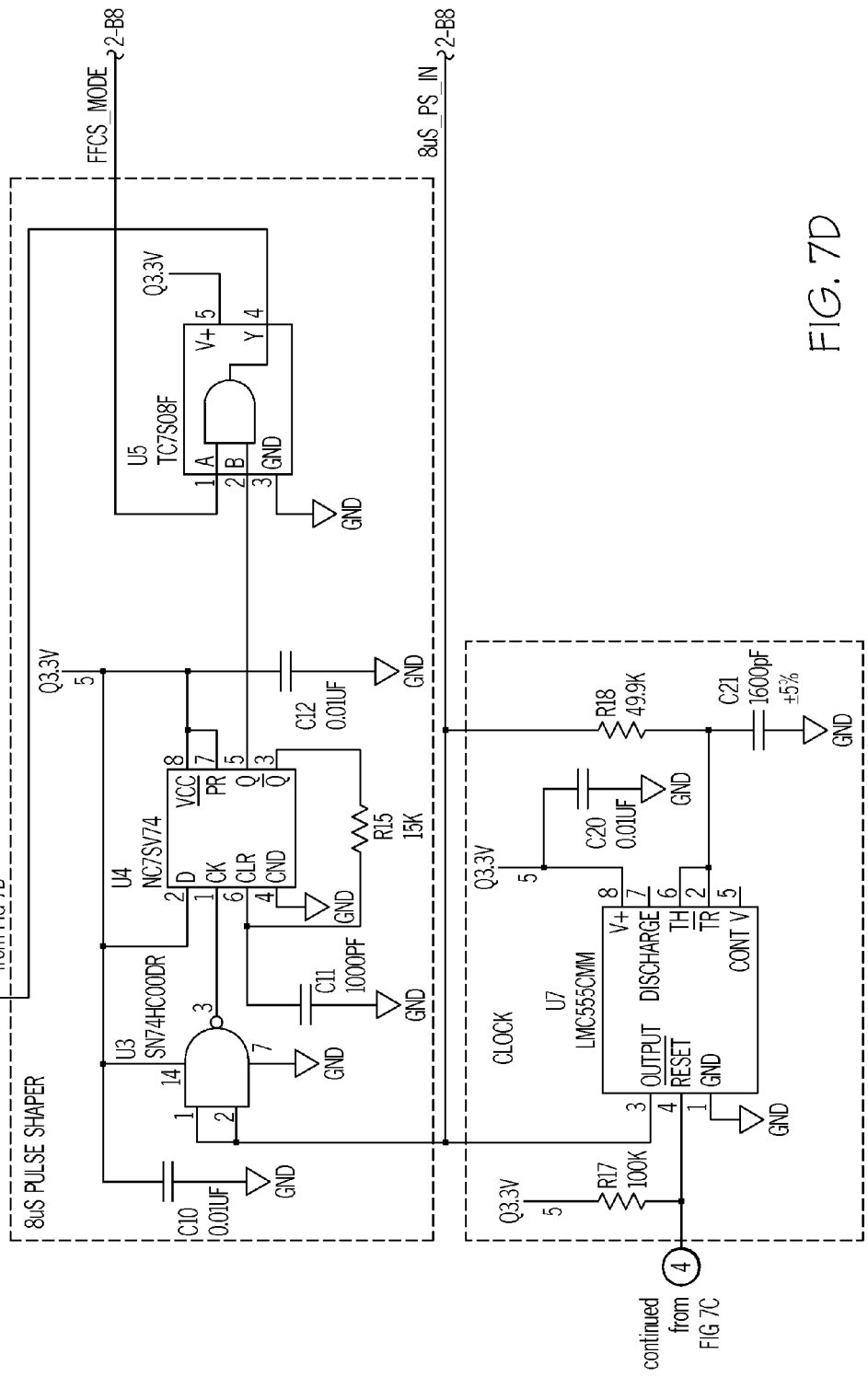
Figure 7E:
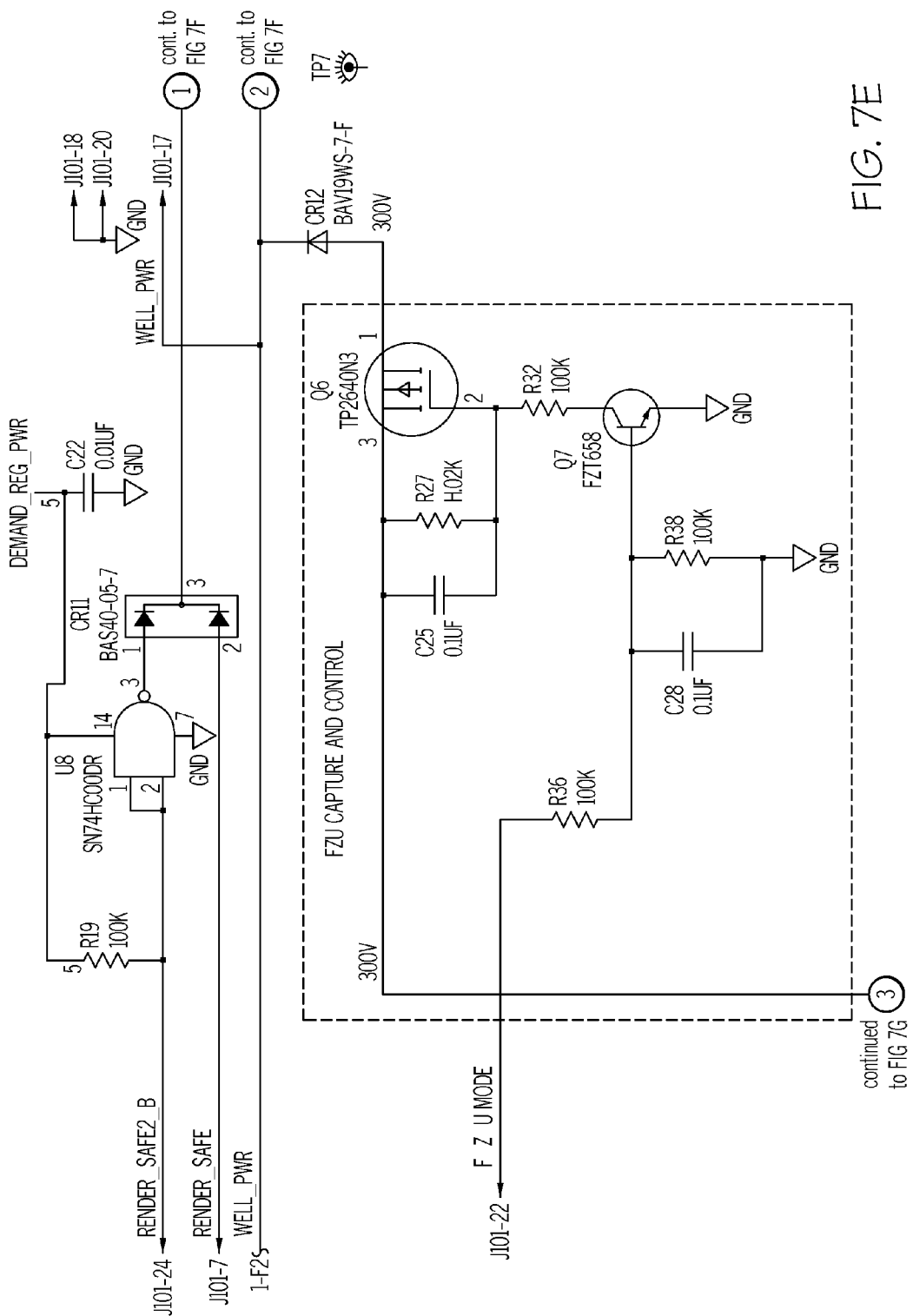
Figure 7F:
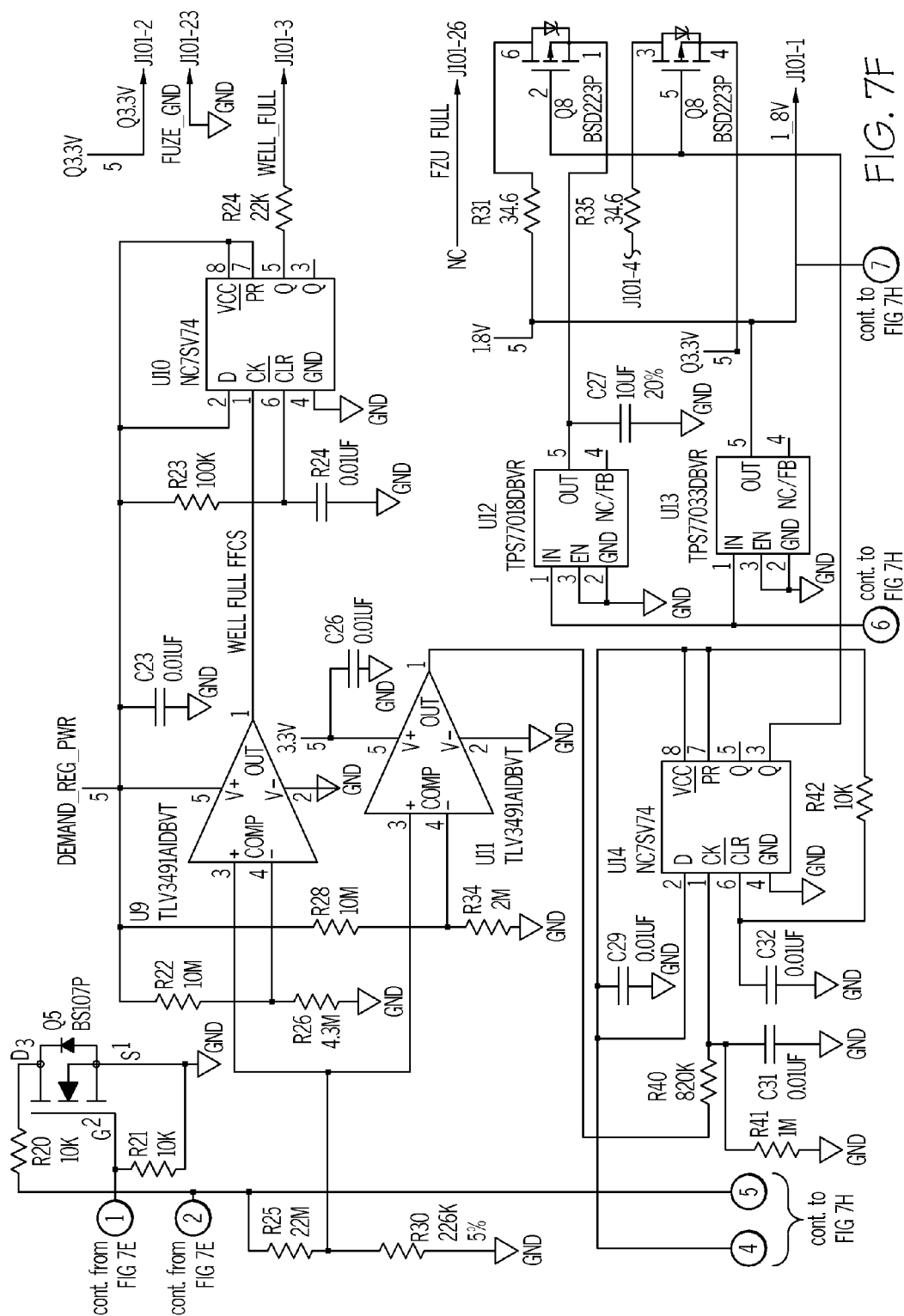
Figure 7G:
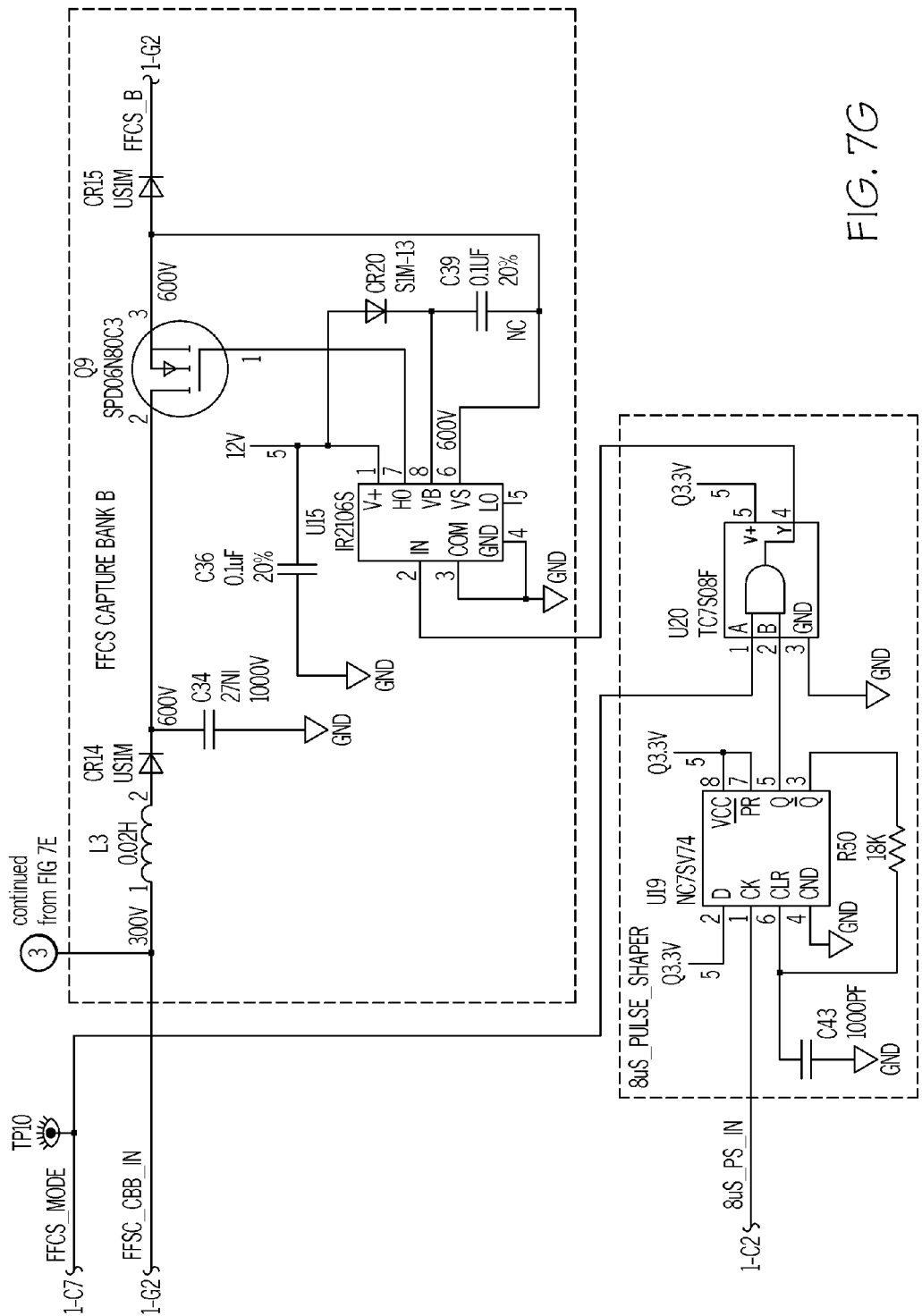
Figure 7H:
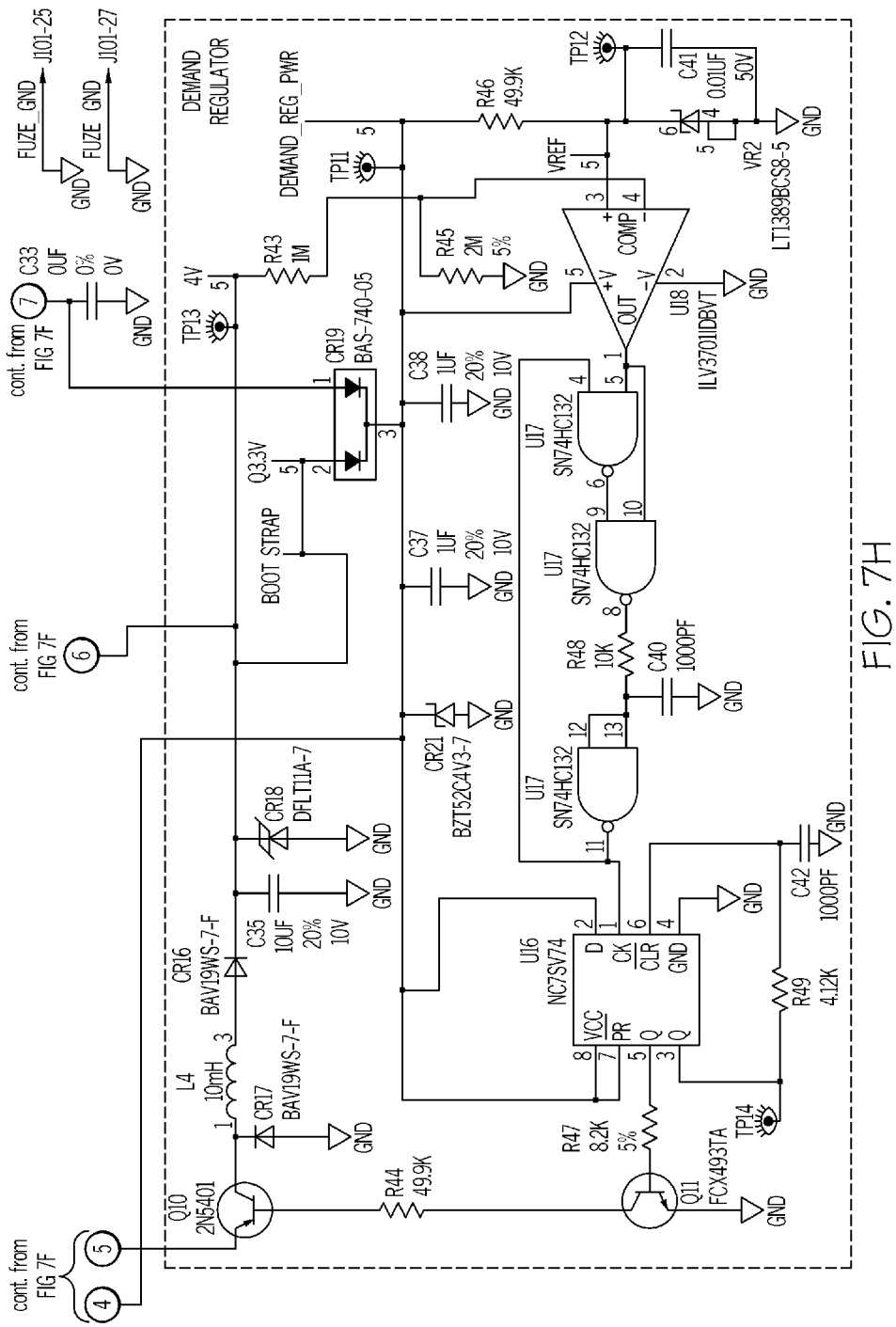

Turning now from the theory of the invention to the circuit design, FIG. 6 shows the at least two capture bank circuits of the present invention. Regarding reference numbers, capture bank "A" elements are shown with a single prime, and capture bank "B" elements are shown with a double prime FIG. 6 depicts "capture bank A" connected to a storage device 20, shown here as a capacitor, through a transfer circuit 22. Transfer circuit 22 is depicted as a buck regulator, Power, shown here as an aircraft supplied DC voltage source V1, is applied to the circuit. Referring now to capture bank A, if switch 24' is open when power is applied, catch diode 26', used later to stop back EMF current, is forward-biased and conducts current, thereby charging capacitor 28'. Due to the series resonant arrangement of the LC circuit, the current waveform becomes a natural sinusoid. Resistor 30' is depicted for the purpose of noting that the inductor 32' is not ideal and has resistance in its windings. Inductor 36 is also non-ideal but its winding resistance is not depicted. As the rising edge of the ac current flows through the inductor 32', a magnetic field is created in which energy is stored. At the point when the capacitor voltage and the DC input voltage become equal, the inductor's magnetic field begins to collapse. As the magnetic field is collapsing, a back EMF voltage is induced across the inductor 32', causing a continued voltage rise and thus current to continue flowing into the capacitor 28' until the magnetic field has completely collapsed. This can be summarized by stating that for an ac current waveform that is positive from 0 to π, from 0 to π/2 the inductor is storing energy and from π/2 to π it the inductor is releasing energy by driving the back EMF voltage across the inductor toward infinity. As a result, the capacitor 28' is continuously charging over the period 0 to π. The same continuous charging result is evident if the circuit is embodied with less efficient energy capture boost regulators for bank A and bank B; because after the inductor is charged to ground by a switch and then the switched is opened, the inductor releases energy by driving the back EMF voltage across the inductor toward infinity and the storage capacitor again continues to charge.

Referring still to FIG. 6, once the capacitor 28' is completely charged, it must be discharged as quickly as possible, with a 14% duty cycle or less, into the storage device 20 in order to avoid interfering with the efficiency of the charge and recharge cycle. Discharge of the capacitor 28' is accomplished by closing a switch 24', shown in FIG. 6 being controlled by a clock pulse from clock 33. When switch 24' is closed, the voltage in the capacitor 28' forward-biases blocking diode 34', causing it to conduct current through output filter inductor 36 and into capacitor 20 for storage. As switch 24' is opening, the magnetic field stored in inductor 36' begins to collapse, and a large voltage is induced across the inductor 36'. Therefore it is necessary to include a free wheeling diode 38 in order to provide a current path to efficiently capture the current produced by the collapsing magnetic field. As an increasing back EMF voltage is induced across the inductor, diode 38 is forward-biased and begins to conduct current and the inductor discharges according to its time constant.

As seen in FIG. 6, capture bank "B" is identical to capture bank "A". As a result, capture bank "B" operates identically to capture bank "A" and its operation need not be explained. Capture bank "B" and capture bank "A" share the transfer circuit 22 and both transfer energy into storage capacitor 20. In order to achieve the two ½ waveforms, an inverter 40 is used, as shown in FIG. 6. Specifically, as the clock pulse goes high from clock 33, switch 24' closes, transferring the energy stored in the capacitor 28' into capacitor 20, but inverter 40 outputs a low to switch 24", causing switch 24" to remain open which keeps capacitor 28" from being discharged. In the next cycle, as the clock pulse goes low, switch 24' opens, causing 28' to begin charging, while inverter 40 outputs a high to switch 24", causing switch 24" to close, transferring the energy stored in capacitor 28" into capacitor 20.

Continuing with the circuit design, it should be clear that maximum energy transfer occurs when the circuit is resonant. At resonance, the voltage and current waveforms are in-phase. Thus, from before, if the energy E=V*I*t, E will be greatest when both V and I achieve a maximum at the same time. This is contrast to an inductive circuit, where the voltage waveform leads the current waveform, and a capacitive circuit, where the current leads the voltage. In these circuits, the energy will not be maximized because as the current reaches its peak, the voltage will not be, and vice versa.

The impedance of a circuit includes both real and imaginary components. The resistance (R) of the circuit accounts for the real portion, while the capacitive reactance ($X_C$) and inductive reactance ($X_L$) account for the imaginary portion. Combined, the resistance and reactance is referred to as the impedance (Z) and is defined as $Z^2=R^2+(X_L-X_C)^2$. From above, in order for the energy transfer to be maximized, the circuit impedance should be neither inductive nor capacitive, and should therefore appear purely resistive. In other words, the circuit should be resonant. As seen from the above equation for impedance Z, if $X_C$ and $X_L$ are equal, Z=R, and is thus entirely real, making the circuit resonant.

As stated above, in one application of an embodiment of the present invention, the input current specification requires that the current not exceed 220 mA. Additionally, the input voltage is 195 V. Since V=I*R, R=195 V/220 mA, or approximately 886 ohms.

In order to calculate values for the inductor and capacitor in the capture bank circuits, the circuit is modeled as a transmission line with a characteristic impedance Z, where Z has no imaginary component and is thus purely real. For a transmission line, the characteristic impedance $Z=\sqrt{(L/C)}$. From before, R=886 for one application of an embodiment of the present, thus $Z=R=886=\sqrt{(L/C)}$. It was determined through circuit simulations via SPICE that L=20 mH and C=27 nF. It should be noted that if the capacitor is too small, there are switching losses that lead to inefficiencies. Also, in at least one embodiment, the inductors were sized with physical space constraints in mind. Thus for other applications, it may be possible to choose different values for the capacitor and inductor in the capture banks that would be more efficient.

The natural frequency of the circuit is defined as $f_{natural}=1/(2\pi*\sqrt{(LC)})$. Substituting the above values for L and C, the natural frequency is approximately 6850 Hz. The reactance of the inductor is defined as $X_L=2\pi fL$, and the reactance of the capacitor is defined as $X_C=1/(2\pi fC)$. Substituting the values of L and C into these confirms that $X_C=X_L=860$ ohms and therefore the circuit is at resonance.

Because the reciprocal of frequency equals the period of the signal, the natural frequency 6850 Hz equates to a period of approximately 145.9 microseconds. But, because only ½ of the signal is used, the period must be divided by 2, which is approximately 73 microseconds. The double pumping of the circuit requires that delays of approximately 27 microseconds be added to allow creation of the proper phasing of the sine waves, therefore a clock period of 100 microseconds was chosen, equating to a clock frequency of 10 kHz.

It should be noted that the input current pulse is DC with a 5% ripple and having a period of about 50 microseconds. It should be further noted that the input source may be an AC voltage source or a DC voltage source. Furthermore, as long as a full-wave bridge rectifier is used, the DC voltage source may be negative.

FIGS. 7A-7H depict a specific application of an embodiment of the energy capture circuit of the present invention. While it will not be described in detail, FIGS. 7A-7H show a number of specific components that may be used to create an embodiment of the energy capture circuit of FIG. 6. With regards to the switches 24' and 24" of FIG. 6, the embodiment shown in FIGS. 7A-7H utilize an electronic switch, specifically a power Metal Oxide Semiconductor Field Effect transistor (MOSFET), generic part number SPD06N80C3. It should be noted that the MOSFET could be replaced with a bipolar junction transistor (BJT). One of ordinary skill will recognize that there are a number of alternative switch designs that could be used.

In at least one embodiment of the present invention, a gate driver, specifically generic part number IR2106S shown in FIGS. 7A-7H, is an operative communication with the gate of the MOSFET and is used to toggle the switches of capture banks A and B on and off.

Referring still to FIGS. 7A-7H, in some embodiments the output of a clock with a frequency of 10 kHz, or period 100 microseconds, such as generic part number LMC555CMM, is in operative communication with the inverter, a NAND gate, generic part number SN74HC08DR. The output of the inverter is fed into the clock input of a flip-flop, generic part number NC7SV74. The non-inverting output of the flip-flop is fed into an AND gate, such as generic part number TC7S08F, the output of which being an input to the gate driver for the switch of capture bank A, described above.

The switch of capture bank B is similarly controlled, except that in order to provide alternating clock pulses between capture banks A and B, the clock signal is tapped at the input of the inverter and fed into the clock input of the flip-flop of capture bank B.

It should be noted that the inductors in the capture banks have pot cores with an air gap and a DC resistance of 8 ohms+/−15%. Furthermore, the inductors also have non-saturating cores.

Finally, although the circuit of FIG. 6 depicts two capture circuits and one input source, it may be possible for one of ordinary skill to include more than two capture circuits and/or multiple input sources in order to increase the efficiency of the energy transfer.

In other less energy capture efficient embodiments of the invention, the circuit is constructed to transfer a pulsed input current source in time divided portions among subcircuits known as buck or boost circuits. In this embodiment, at least two subcircuits are provided, each subcircuit comprising at least one inductor in operative communication with the at least one input source. Each subcircuit further comprises a two terminal capacitor and a three terminal transistor. The first terminal of each capacitor and each transistor is in operative communication with the second terminal of the at least one inductor. The second terminal of each capacitor is in operative communication with a inductor as previously described. The second terminal of the transistor is connected to circuit ground, with the third terminal of the transistor in operative communication with the clock, as described above.

The phrase "storage means" should be construed as including capacitors, passive storage elements, and all obvious means of storing energy known to those of ordinary skill in the art but not explicitly listed above.

The phrase "clock means" should be construed as including CMOS timers, crystal oscillators, RC oscillators, multivibrators, ring oscillators, digital clock generators/oscillators, and all obvious means of providing a clock signal known to those of ordinary skill in the art but not explicitly listed above.

The phrase "inductive means" should be construed as including inductors, coils, chokes, transformers, and all obvious means of producing inductance known to those of ordinary skill in the art but not explicitly listed above.

The phrase "rectifying means" should be construed as including diodes, SCRs, electronic switches (e.g. FETs, BJTs, IGBTs, relays) and all obvious means of rectifying a signal known to those of ordinary skill in the art but not explicitly listed above.

The phrase "capacitive means" should be construed as including capacitors, and all obvious means of producing capacitance known to those of ordinary skill in the art but not explicitly listed above.

The phrase "switch means" should be construed as including transistors (e.g. BJTs, FETs, IGBTs, etc.), relays (e.g. single-pole, single throw), mechanical switches, spark gaps, and all obvious means of opening a circuit known to those of ordinary skill in the art but not explicitly listed above.

The phrase "inverter means" should be construed as including NAND gates, NOR gates, logical inverters (e.g. CMOS, TTL, etc), transistors (BJTs, FETs, IGBTs, etc.) and all obvious means of inverting a signal known to those of ordinary skill in the art but not explicitly listed above.

The phrase "current interruption means" should be construed as including diodes (back EMF blocking, catch rectifying), transistors (BJT, FET, IGBT, etc.), relays (e.g. single-pole, single-throw), mechanical switches, and all obvious means of preventing current from flowing known to those of ordinary skill in the art but not explicitly listed above The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method of capturing energy, the method comprising:
storing a first energy in a first capacitor of a circuit;
storing a second energy in a second capacitor of the circuit;
alternatingly transferring the first energy stored in the first capacitor and the second energy stored in the second capacitor to a third capacitor via a first switch in electrical communication with the first capacitor and a second switch in electrical communication with the second capacitor, respectively;
controlling the first switch and the second switch via a clock output,
wherein the clock output controls the first switch, and wherein the clock output controls the second switch via an inverter output.

2. The method of claim 1, further comprising:
producing a first half current waveform by controlling the first switch; and
producing a second half current waveform by controlling the second switch,
wherein the first half current waveform is out-of-phase with the second half current waveform.

3. The method of claim 2, wherein the first half current waveform is out-of-phase with the second half current waveform by about 120 degrees.

4. An energy capture circuit comprising:
first storage means for storing a first energy of a circuit;
second storage means for storing a second energy of the circuit;
means for alternatingly discharging the first energy and the second energy to a third storage means via a first switch means in electrical communication with the first storage means and a second switch means in electrical communication with the second storage means, respectively,
wherein the means for alternatingly discharging the first energy and the second energy to a third storage means comprises:
clock means for controlling the first switch means and the second switch means, wherein the clock means controls the second switch means via inverter means.

5. The circuit of claim 4, wherein the clock means for controlling the first switch means and the second switch means is configured to:
produce a first half current waveform by controlling the first switch means; and
produce a second half current waveform by controlling the second switch means,
wherein the first half current waveform is out-of-phase with the second half current waveform.

6. The circuit of claim 5, wherein the first half current waveform is out-of-phase with the second half current waveform by about 120 degrees.

7. The circuit of claim 4, wherein at least one of the first switch means and the second switch means is a transistor selected from the group consisting of bipolar junction transistors and field effect transistors.

8. The circuit of claim 4, wherein at least one of the first storage means, the second storage means, and the third storage means is a capacitor.

9. The circuit of claim 4, in combination with bomb fuze circuitry.

10. An energy capture circuit comprising:
a first subcircuit comprising:
a first inductor; and
a first capacitor in electrical communication with the first inductor, the first capacitor configured to store first energy from an input source;
a second subcircuit comprising:
a second inductor; and
a second capacitor in electrical communication with the second inductor, the second capacitor configured to store second energy from the input source;
a first switch in electrical communication with the first capacitor;
a second switch in electrical communication with the second capacitor;
a storage capacitor; and
a transfer circuit in electrical communication with the storage capacitor, wherein the transfer circuit is configured to alternatingly transfer the first energy stored in the first capacitor and the second energy stored in the second capacitor to the storage capacitor via the first switch and the second switch, respectively,
the energy capture circuit further comprising:
a clock having an output; and
an inverter having an input and an output, the inverter input receiving the clock output,
wherein the clock output controls the first switch, wherein the clock output controls the second switch via the inverter output, and wherein the clock output is out-of-phase with the inverter output.

11. The circuit of claim 10, wherein the clock output is out-of-phase with the inverter output by 180 degrees.

12. The circuit of claim 10, wherein the at least one transfer circuit comprises a buck regulator.

13. The circuit of claim 10, in combination with bomb fuze circuitry.

* * * * *